(12) United States Patent
Wooder et al.

(10) Patent No.: US 9,784,961 B2
(45) Date of Patent: Oct. 10, 2017

(54) SPERM MOTILITY TEST DEVICE AND METHOD

(71) Applicant: CHURCH & DWIGHT CO., INC., Princeton, NJ (US)

(72) Inventors: Nicholas James Wooder, Royston (GB); Giles Sanders, Fowlmere (GB); Albert R. Nazareth, Mercerville, NJ (US); Shang Li, West Windsor, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 451 days.

(21) Appl. No.: 14/183,982

(22) Filed: Feb. 19, 2014

(65) Prior Publication Data
US 2014/0254004 A1  Sep. 11, 2014

Related U.S. Application Data

(60) Provisional application No. 61/774,990, filed on Mar. 8, 2013.

(51) Int. Cl.
*G02B 21/06* (2006.01)
*G02B 21/12* (2006.01)
(Continued)

(52) U.S. Cl.
CPC ......... *G02B 21/12* (2013.01); *G02B 21/0004* (2013.01); *G02B 21/086* (2013.01); *G02B 21/34* (2013.01); *G02B 21/365* (2013.01)

(58) Field of Classification Search
CPC ...... G02B 21/12; G02B 21/34; G02B 21/365; G02B 21/0004; G02B 21/086
(Continued)

(56) References Cited

U.S. PATENT DOCUMENTS 4,116,775 A   9/1978   Charles et al.
4,601,578 A   7/1986   Woolhouse et al.
(Continued)

FOREIGN PATENT DOCUMENTS

DK   WO2012126478 A1   9/2012

OTHER PUBLICATIONS

Agarwal, A., Sharma, R, K., & Nelson, D. R. (2003). New semen quality scores developed by principal component analysis of semen characteristics. Journal of Andrology, 24(3), 343-52.
(Continued)

*Primary Examiner* — Scott J Sugarman
*Assistant Examiner* — Mustak Choudhury
(74) *Attorney, Agent, or Firm* — Church & Dwight Co., Inc.

(57) ABSTRACT

Test kits for assessing male fertility include a sample holder defining an object plane, a lens, and a two dimensional light sensor defining an image plane arranged along a common linear axis. The distance between the object plane and the image plane may be no more than 50 mm, and may be no more than 30 mm. A lens aperture may have an area of 1-10 mm². The test kit may have a housing with a maximum linear dimension of no more than 100 mm. Processing circuitry may be provided that is configured to produce a sperm count and/or sperm motility measurements by processing image data from the two-dimensional light sensor.

20 Claims, 4 Drawing Sheets

(51) Int. Cl.
*G02B 21/34* (2006.01)
*G02B 21/36* (2006.01)
*G02B 21/00* (2006.01)
*G02B 21/08* (2006.01)

(58) Field of Classification Search
USPC ....... 359/362, 363, 368, 369, 385, 387–398, 359/800, 801, 804; 382/6, 128; 356/244, 356/442; 435/288.7, 291.3; 600/101, 600/160, 178, 180, 181; 350/525; 422/82.05
See application file for complete search history.

(56) References Cited

U.S. PATENT DOCUMENTS

| | | | |
|---|---|---|---|
| 4,896,966 A * | 1/1990 | Boisseau | A61B 5/1105 |
| | | | 356/244 |
| 5,093,866 A | 3/1992 | Douglas-Hamilton et al. | |
| 5,267,087 A * | 11/1993 | Weidemann | A61B 10/0012 |
| | | | 359/385 |
| 5,510,246 A | 4/1996 | Morgan | |
| 6,004,821 A | 12/1999 | Levine et al. | |
| 7,629,165 B2 | 12/2009 | Wyatt et al. | |
| 2005/0227350 A1 | 10/2005 | Muthiah et al. | |
| 2008/0266655 A1* | 10/2008 | Levoy | G02B 21/361 |
| | | | 359/368 |
| 2009/0155920 A1 | 6/2009 | Carlson | |
| 2011/0207621 A1 | 8/2011 | Montagu et al. | |
| 2012/0045757 A1* | 2/2012 | Kjaerulff | G01N 21/6458 |
| | | | 435/6.11 |
| 2012/0224053 A1* | 9/2012 | Vykoukal | B01L 3/502715 |
| | | | 348/135 |

OTHER PUBLICATIONS

Bailey, E., Fanning, N., Chamberlain, S., Devlin, L., Hopkisson, J., & Tomlinson, M. (2007). Validation of sperm counting methods using limits of agreement. Journal of Andrology, 28(3), 364-73.

Gottlieb, C., Bygdeman, M., & Thyberg, P. (1991). Dynamic laser light scattering compared with video micrography for analysis of sperm velocity and sperm head rotation. Andrologia, 5, 1-5. (abstract).

Kirkman-Brown, J., & Björndahl, L. (2009). Evaluation of a disposable plastic Neubauer counting chamber for semen analysis. Fertility and Sterility, 91(2), 627-31. (abstract).

Parrish, J., & Foote, R. (1987). Quantification of Bovine Sperm Separation by a Swim-up Method Relationship to Sperm Motility, Integrity of Acrosomes, Sperm Migration in Polyacrylamide Gel and. Journal of Andrology.

Rigler, R., & Thyberg, P. (1984). Rotational and translational swimming of human spermatozoa: a dynamic laser light scattering study. Cytometry, 5(4), 327-32.

Seaman, E., Bar-Chama, N., & Fisch, H. (1994). Semen Analysis in the clinical evaluation of infertility. Mediguide to Urology, 7(5), 1-8.

Seaman, E. K., Goluboff, E., BarChama, N., & Fisch, H. (1996). Accuracy of semen counting chambers as determined by the use of latex beads. Fertility and Sterility, 66(4), 662-5.

Tilley, B. (2007). Assessment of Boar Sperm Samples by Computer-Assisted Sperm Analysis and the Mobility Assay. Texas Tech University.

Vosshall, L. B. (2004), Olfaction: attracting both sperm and the nose. Current Biology: CB, 14(21), R918-20. (abstract).

Zhang X., Khimji, I., Gurkan U., Safaee H., Catalano, P., Keles H., Kayaaip, E. & Demirci, U. (2011), Lensless imaging for simultaneous microfluidic sperm monitoring and sorting. The Royal Society of Chemistry, Lab Chip, 11, 2535-2540.

Final Office Action for U.S. Appl. No. 14/183,909, mailed Feb. 4, 2016, which corresponds to this patent application.

Non-Final Office Action for U.S. Appl. No. 14/183,909, mailed Jul. 22, 2016, pp. 1-48, which corresponds to this patent application.

* cited by examiner

SPERM MOTILITY TEST DEVICE AND METHOD

REFERENCE TO RELATED APPLICATION

This application is related to U.S. Provisional Application Ser. No. 61/774,990 filed Mar. 8, 2013, and takes priority therefrom.

BACKGROUND

Field

The embodiments disclosed herein relate to test devices and methods for assessing male fertility.

Description of the Related Art

Male fertility is generally assessed by counting the number of sperm per milliliter in a semen sample. Traditionally, this has been done manually by a trained andrologist. A semen sample is placed under a microscope, and the number of observed sperm are counted in a given area of view. This count is correlated to sample volume to produce a value for sperm per milliliter. In addition to sperm count, sperm motility is also a significant factor in assessing male fertility. A qualitative assessment of sperm motility can be made by visually evaluating the motion of the sperm in the sample under the microscope. These microscope systems are generally expensive, and can produce inconsistent results, even when used by well trained personnel.

Home use reagent based sperm count assays have been developed, such as the SpermCheck® male fertility test kit produced by ContraVac, Inc. and Princeton BioMeditech Corp. This kit can be used at home for a threshold test of sperm count. However, a numerical result for sperm count is not obtainable with this test kit, and it has no facility for assessing sperm motility.

SUMMARY

In one implementation, a male fertility assessment apparatus comprises a housing having a maximum linear dimension of no more than 100 mm and wherein the ratios of height to width, height to length, and length to width are between 0.1 and 10, and having a bright field imaging system contained within the housing. In this implementation, the bright field imaging system comprises a backlight, an optical assembly comprising a lens system having front and back focal lengths of no more than 20 mm each, and an aperture area of 1-10 $mm^2$. The front focal length divided by the square root of the aperture area and the back focal length divided by the square root of the aperture area are each at least 5. The system also comprises a two-dimensional light sensor defining an image plane location that is fixed with respect to the position of the lens system. The apparatus further comprises a sample holder, and a sample chamber configured for placement in the sample holder to define an object plane location that is fixed with respect to the position of the lens system. The image plane position, object plane position, and front and back focal lengths define a magnification of no more than 10. The apparatus further comprises processing circuitry contained within the housing coupled to the light sensor and configured to process data received from the light sensor to assess one or more sperm characteristics, and an output coupled to the processing circuitry and configured to output data indicating one or more sperm characteristics.

In another implementation, a method of assessing male fertility comprises placing a semen sample into a sample chamber having a depth of no more than 0.05 mm, inserting the sample chamber into a sample holder positioned adjacent to a lens, illuminating the sample chamber, producing an image of the semen sample on a two-dimensional light sensor positioned on the other side of the lens from the sample chamber and no more than 50 mm from the center of the sample chamber, processing image data from the two-dimensional light sensor, and outputting an assessment of male fertility based at least in part on the processing.

In another implementation, a male fertility assessment apparatus comprises a housing, a light source in the housing, a fixed two-dimensional light sensor in the housing, a fixed sample holder in the housing defining a sample chamber position located between the light source and the fixed two-dimensional light sensor. The defined sample chamber position is no more than 50 mm from the fixed two-dimensional light sensor. The apparatus also includes one or more fixed lenses in the housing positioned between the fixed sample holder and the fixed two dimensional light sensor, and processing circuitry in the housing coupled to receive image data from the fixed two dimensional light sensor.

DETAILED DESCRIPTION

Embodiments will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments disclosed herein. Furthermore, embodiments disclosed herein may include several novel features, no single one of which is solely responsible for its desirable attributes or which is essential to the embodiments herein described.

Figure 1:
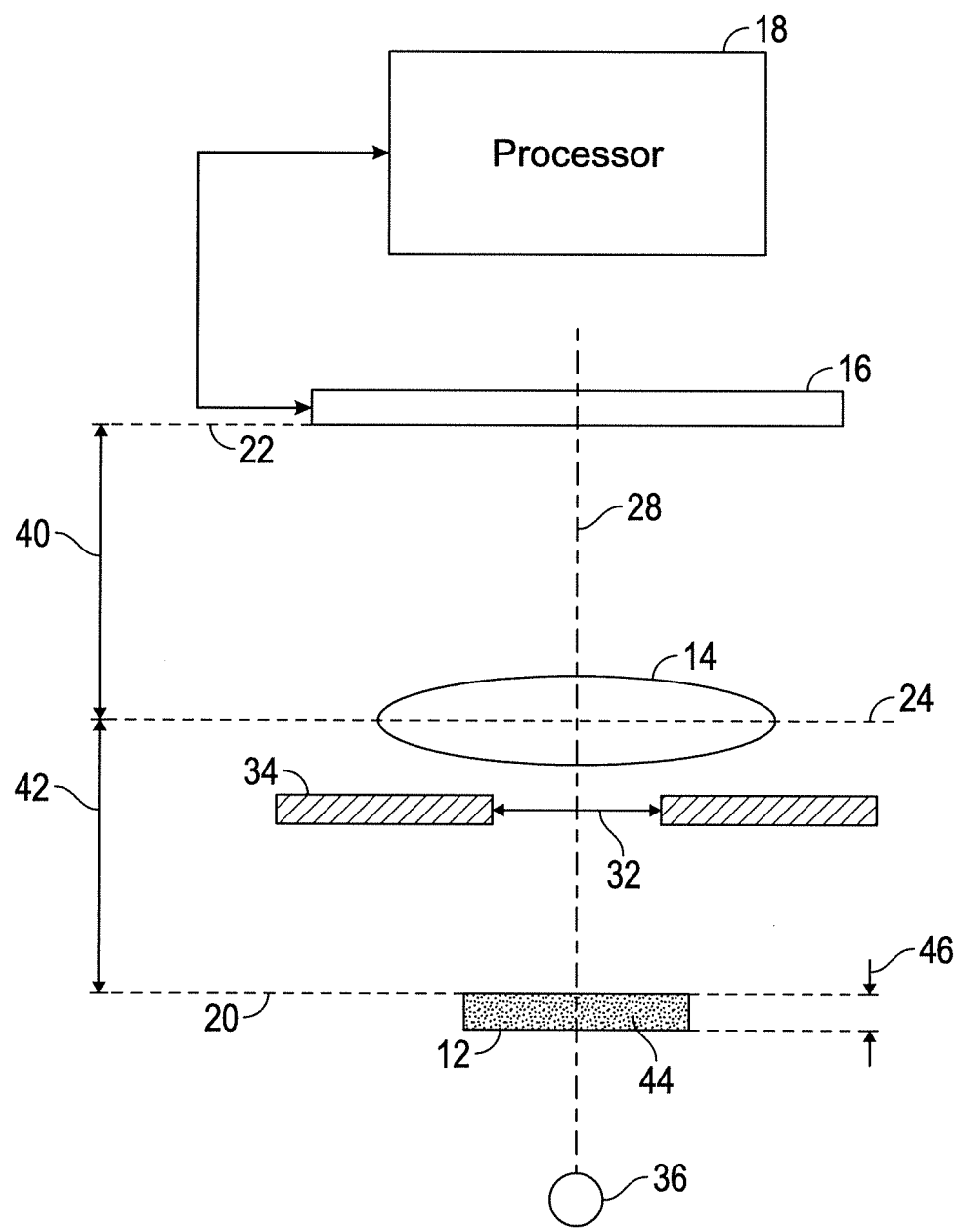
FIG. 1 is a block diagram of a male fertility assessment apparatus.

Referring now to FIG. 1, components of a male fertility assessment apparatus are illustrated. The apparatus includes a sample chamber 12, at least one lens 14, and a two-dimensional light sensor 16. The light sensor 16 may be a CCD array having an output that is coupled to a processor 18 for analyzing image data acquired by the light sensor 16. The CCD array includes a two-dimensional arrangement of light sensitive pixels. A variety of pixel formats are possible. Common commercially available types have 640×480 Pixels, 1024×768 pixels, or 1360×1240 pixels for example. Any of these are suitable for the present application. Pixels are generally a square shape, with equal height and width in the range of about 1 to 5 micrometers. In this implementation, the orientation of the sample chamber 12 defines an object plane 20 which runs through the center of the sample chamber. The orientation of the light sensor 16 defines an image plane 22 defined by the surface of the light sensor 16 on which the light sensitive pixels of the sensor 16 are positioned. The image plane 22 and the object plane 20 may be substantially parallel. The lens 14 is positioned between the image plane and the object plane. Although a single simple lens is illustrated, and is described below with reference to the example apparatus implementations, an additional one or more lenses may be provided to form a multiple lens imaging system. As used herein, a "single simple lens" means a lens molded, machined, or otherwise formed from a single piece of transparent material. A "single compound lens" means a lens formed from two or more separate pieces of transparent material placed physically in contact. A "multiple lens system" means a system having two or more single simple lenses and/or single compound lenses not in contact but separated from one another. To minimize the size and cost of the apparatus, a single simple lens or single compound lens is advantageous, but multiple lens systems are also possible to use. Lenses of the system may be glass, polymer, crystal, or any other refractive material, but to minimize costs, polymer lenses are advantageous and have been found suitable for the systems described below.

A single simple or compound lens 14 may be oriented in a transverse lens plane 24 that may be substantially parallel to the image plane 22 and object plane 20. At least a portion of the sample chamber 12, the lens 14, and the light sensor 16 are aligned along a linear longitudinal axis 28. In most convenient implementations, the center of the viewed area of the sample chamber 12, the center of the lens 14, and the center of the light sensor 16 are all positioned on this linear longitudinal axis 28. An aperture 32 may be provided by a stop 34 with an opening therein on either side of the lens 14. A light source 36 provides lighting through the sample chamber 12, through the lens 14, and to the light sensor 16.

The components of the apparatus of FIG. 1 are optimized in relative position and characteristics to produce a low cost, small size imaging male fertility assessment device that has not previously been contemplated. This is accomplished by careful selection and control over the separation distances between the components, sizes of the components, focal length of the lens 14, and other characteristics of the apparatus components. In the discussion below, the lens 14 "focal length" is discussed. This parameter is used for convenience below and is generally applied to ideal thin lenses. For lens systems having a single lens of non-negligible thickness, or for multiple lens systems, a front focal length may be defined by the distance from the center of the front face of the lens system (on the side of the sample chamber 12) and the focal point on that side of the lens system. A back focal length may be similarly defined by the distance from the center of the back face of the lens system (on the side of the light sensor 16) to the focal point on that side of the lens system. For ideal thin lenses, these values are the same, and may be considered to be equal to or essentially equal to the distance between the center of the lens at plane 24 and each focal point. The assumption of a thin lens with single focal length parameter value is made below to illustrate the principles of operation of the system.

To produce a small size apparatus, the object distance DO (designated 42 in FIG. 1) plus the image distance DI (designated 40 in FIG. 1) should be small. The sum DO+DI is related to the focal length (F) of the lens or lenses 14 and the magnification (M) of the image on the sensor 16 by the equation $DO+DI=F(M+1)^2/M$.

To produce a real and magnified image at the sensor 16, DO and DI will both be larger than F. If the sample chamber 12 is moved closer to the lens toward the focal point, the magnification increases, and the distance DI to the in focus real image where the surface of the light sensor 16 will be positioned also increases. The minimum total distance DO+DI where the magnification is 1 is 4F. It has been found (and as described further below) that suitable images for accurate male fertility assessment can be produced using short focal length lenses and moderate magnification levels, allowing a short distance DO+DI between the object plane at the center of the sample chamber 12 and the image plane at the surface of the light sensor 16. In these implementations, the focal length of the lens 14 may be selected to be no more than 20 mm, in some cases no more than 10 mm or even no more than 5 mm. Focal length values of 3 mm to 20 mm are suitable in many implementations. For simple lenses with non-negligible thickness or in multiple lens implementations, both the front focal length (distance from front focal point to center of front face of lens or lens system) and the back focal length (distance from back focal point to center of back face of lens or lens system) may fulfill these requirements. Magnification levels can also be relatively low, generally less than 10, and in many cases between 1 and 3. In such implementations, the distance between the object plane 20 and the image plane 22 can be made no more than 50 mm, in many cases no more than 20 mm.

The size of the field of view of the sample chamber that is analyzed for sperm characteristics is also a consideration in apparatus design. A larger field of view includes more sperm to track and count as described further below, increasing the amount of processing required. A smaller field of view requires more magnification to produce an image over a given area of the light sensor 16, increasing the size of the apparatus. For these reasons, it has been found suitable to image a field having height and width of between 0.2 and 0.5 mm onto a light sensor area having a height and width of between 0.5 mm and 1.5 mm containing, for example, a 512×512 or 1024×1024 portion of the array of light sensitive pixels. The height and width of each pixel in the light sensor area containing the image may advantageously be less than 6 micrometers, more advantageously between 1 and 2 micrometers for good resolution under relatively low magnification.

Another consideration in producing accurate images at the light sensor 16 is the depth of field of the imaging system. The depth of field is a parameter that indicates the tolerable variations in object deviation from the ideal object plane for an acceptably focused image of the object at the image plane. As seen in FIG. 1, objects 44 such as sperm in a semen sample that are in the sample chamber 12 can move up or down within the depth dimension of the sample chamber 12 perpendicular to the axis 28, therefore moving in front of or behind the object plane 20 defined by the center of the sample chamber 12. Sperm that sit away from or migrate away from the object plane will be defocused on the light sensor 16. To reduce this defocusing effect from different sperm positions within the depth of the sample chamber, the depth of the sample chamber can be made thin, while still being thick enough for the sperm in the sample to move inside the sample chamber. As sperm heads are typically in the 3-5 micrometer diameter range, a depth 46 between the top and bottom of the sample chamber of no more than 0.05 mm has been found suitable, more preferably no more than 0.025 mm, with 0.02 mm having been found suitable in one specific implementation. It is also preferable for the sample chamber 12 to have a depth of at least 0.01 mm to hold a sufficient quantity of motile sperm with freedom to move around.

In these implementations, it has been found that over a wide range of sperm concentrations in the sample, highly focused images of individual sperm heads is not necessary for accurate fertility assessment. However, a depth of field that is reasonably commensurate with the thickness of the sample chamber may be beneficial. Although the depth of field of an optical system is often expressed numerically, it is in fact a somewhat qualitative measure, as the definition of acceptable focus is somewhat qualitative. However, it is known that the depth of field increases with increasing f-number of the optical system. The f-number is the focal length F of the lens divided by the diameter of the aperture (normally assumed to be circular) through which the light passes from the subject and through the lens, which is designated 32 in FIG. 1. Longer lens focal length improves depth of field, but increases the DO+DI distance discussed above. For the desired shorter lens focal lengths used to reduce the object plane to image plane distance, the dimensions of the aperture 32 can be further selected to provide a larger f-number with a shorter focal length lens. Because apertures can have a variety of shapes, and thus there could be some confusion as to what is meant by the "diameter" of a non-circular aperture, we will define herein a number N (which is nearly identical to the traditional f-number) as the lens focal length F divided by the square root of the aperture area. For a circular aperture used with lens focal lengths of 20 mm or less, aperture areas of 1 to 10 mm$^2$ have been found suitable, corresponding to circular diameters of less than 4 mm, with about 2 mm or less often being desirable. for the aperture 32. Within these ranges for focal lengths and aperture sizes, an N of at least 5 has been found suitable for producing images with sufficient sharpness over a sample chamber of less than 0.05 mm.

Because larger f-numbers (and larger N values) produce darker images and require longer exposure times, the N value should also not be too large. Another reason N should not be too large is that if an increase in N is produced by making the aperture smaller, the numerical aperture of the system decreases, which decreases the resolution of the imaging system. N values are preferably no more than about 20.

In addition, depth of focus decreases with increasing magnification (M) of the objects being viewed. Low to moderate magnifications (e.g. no more than 10 as described above, preferably 1 to 3) are therefore also useful in providing a suitable depth of focus.

If it is desired to limit the blur produced in the image of an object as the object moves from the top to the bottom of a 0.02 thick sample chamber 12 to no more than two or three pixel widths of 2 micrometers on the light sensor 16 surface, the ratio N/M may be made to be greater than 1, with any increases in this ratio tending to widen the depth of field of the optical system, bringing more of the sample chamber 12 depth into sharper focus. As the sample chamber gets deeper, larger N values and/or smaller M values may be used to widen the depth of field, but as discussed above, a relatively thin sample chamber allows more variation in N and M while still providing a suitable depth of field. It has been found that with such a system, no provision for lens motion for a focusing function is necessary. The light sensor 16, lens 14, and sample chamber 12 may be held in fixed positions relative to each other. This simplifies the construction of the device, allowing for a smaller, lower cost system.

As one example system, a polymer single simple lens 14 with focal length F of 6 mm, a circular aperture 32 of 1 mm diameter, at a magnification M of 3 may be used. With this implementation, DO is 8 mm, and DI is 24 mm. This system has an f number of 6, and a value for N as defined above of about 6.8. This will produce less than 5 micrometer blur at the light sensor for object migration to the top or bottom of a 0.02 mm deep sample chamber, and will resolve objects to within about 3 micrometers.

Figure 2:
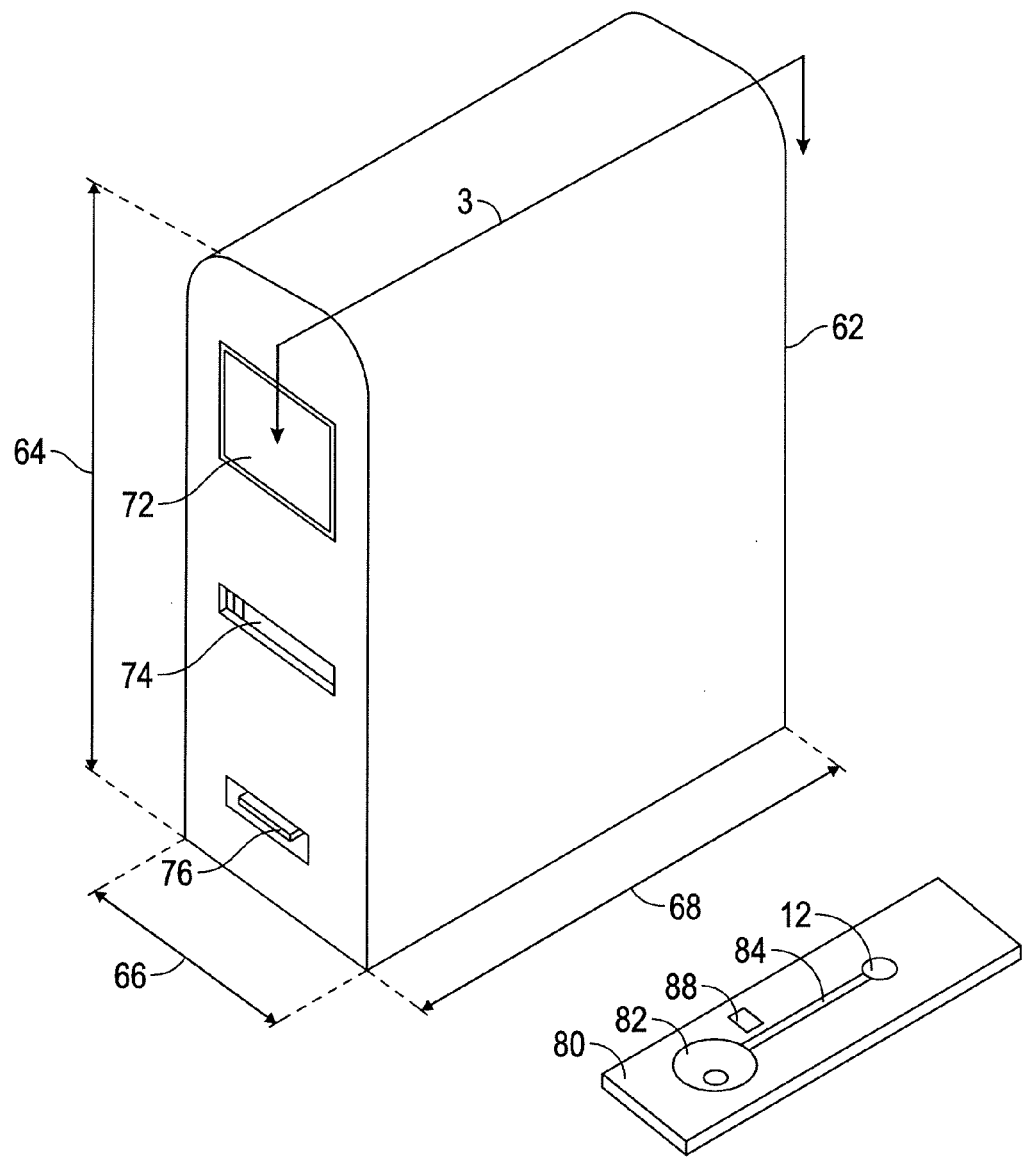
FIG. 2 is an illustration of a small size, low cost male fertility assessment apparatus.
Figure 3:
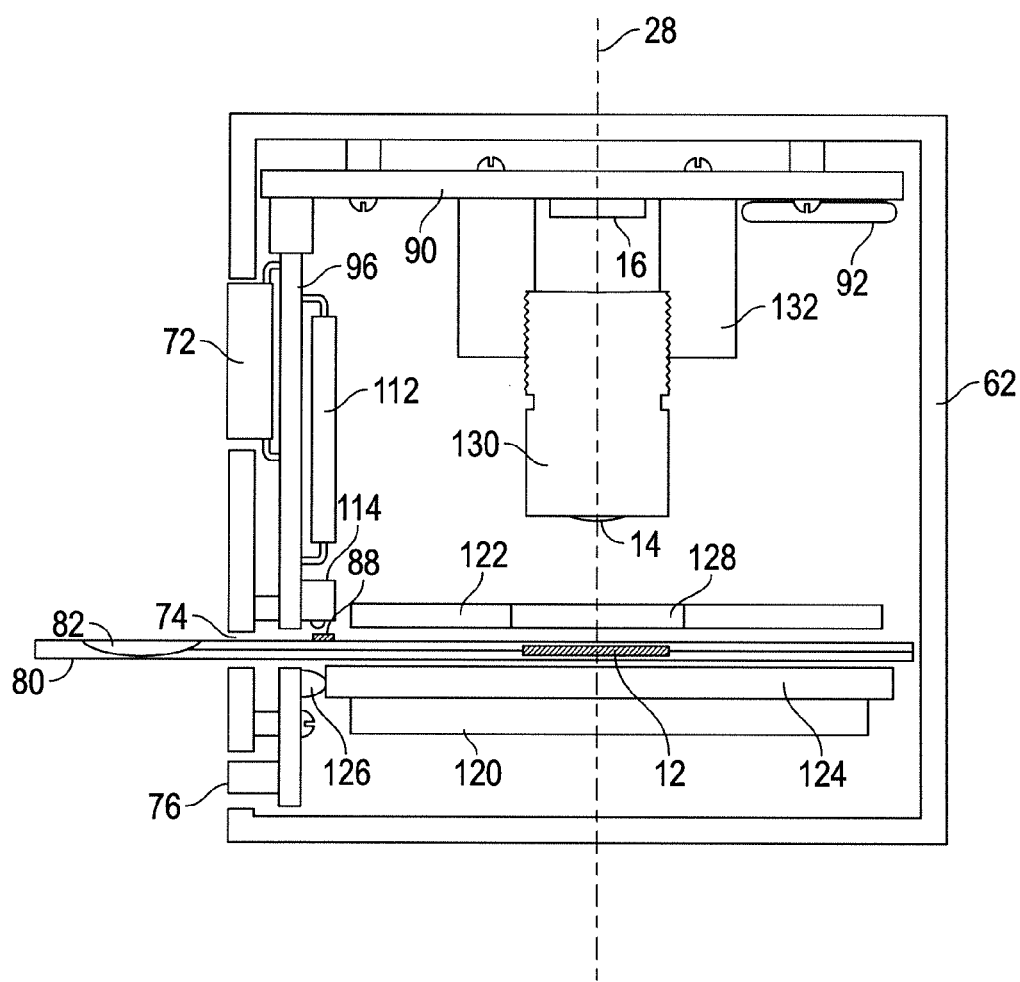
FIG. 3 is a cross section of the apparatus of FIG. 2.

A male fertility test kit produced in accordance with the above principles is illustrated in FIGS. 2 and 3. FIG. 3 is a cross section of the apparatus of FIG. 2 along line 3 in FIG. 2. The apparatus includes a housing 62, which may be much smaller than any similar function apparatus previously produced. For example, the enclosure 62 may have a height 64 of 50 mm or less, a width 66 of 20 mm or less, and a length 68 of 50 mm or less. In this package, the maximum dimension of the housing from one corner to the farthest diagonal corner is less than 75 mm, and it has a volume of about 50,000 cubic millimeters. Preferably, the housing has a maximum dimension between two points of maximum linear distance apart of no more than 100 mm, and may be less than 50 mm depending on characteristics of the components used as described above. Also, the ratios of height 64 to width 66, height 64 to length 68, and length 68 to width 66 may be between 0.1 and 10.

The volume is preferably less than 100,000 cubic millimeters, and may be less than 10,000 cubic millimeters.

The apparatus includes a sample input port 74, which is configured to accept a sample slide 80 having the sample chamber 12 embedded therein. The sample slide 80 includes a sample application port 82 onto which a semen sample may be applied, which can fill the sample chamber 12 by, for example, capillary action through a channel 84. The sample slide 80 may also have a reflective portion 88 for automated start up of the apparatus when the sample slide 80 is inserted as described further below.

The apparatus may include a display 72, such as an LCD display for outputting results of the fertility assessment. One or more LED lights may additionally or alternatively be provided for outputting assessment results. In addition, a digital output or input/output port 76 may be provided for outputting results to a separate computing device such as a PC. This may be a USB port for example. This port may be used to communicate results, raw image data, or other information generated by the apparatus during use. The port 76 may also be used to input image processing parameters or other functional instructions to the apparatus. The same communication capability could also be provided wirelessly.

Turning now to FIG. 3, the internal components of the apparatus are illustrated with the sample slide 80 inserted. As described above with reference to FIG. 1, the sample chamber 12, lens 14, and two dimensional light sensor 16 are arranged along a common linear axis 28. Although a variety of packaging options could be used, this implementation includes a printed circuit board 90 mounted to the top of the housing 62 which mounts the two dimensional light sensor 16, a battery 92, and other circuits for acquiring the images of the sample chamber 12. A second printed circuit board 96 connected to the top printed circuit board 90 is coupled to the front of the housing 62 and mounts the display 72, processor integrated circuit 112, and data port 76. An opening may be provided in this printed circuit board 96 through which the sample slide 80 is inserted. This circuit board 96 may also mount an LED and photodetector 114 that is adjacent to the reflective portion 88 of the sample slide 80 when the slide 80 is fully seated in the sample input port 74. When the photodetector receives reflected LED light, the system may automatically exit a sleep mode and begin performing image acquisition.

In the implementation of FIG. 3, the sample slide is held a fixed distance from the lens 14 and sensor 16 by a sample holder which includes a lower support structure 120 and an upper guide structure 122 with an opening 128 between the sample holder 12 and the lens 14. In this implementation, an edge lit polymer (e.g. acrylic) sheet or strip 124 is positioned on the lower support 120 and is edge lit by one or more LED's 126 on the front printed circuit board 96. This provides a backlight source for bright field illumination of the sample chamber 12 onto the sensor 16. The sample slide 80 rests on the top surface of this edge lit strip 124. Edge lit backlighting is has the benefit of its low profile, but any other type of backlighting is also possible, for example direct LED or incandescent lighting from underneath the sample chamber 12. The sample holder, which in this implementation includes the lower support structure 120, upper guide structure 122, and edge lit strip 124 is positioned and configured to hold the sample slide 80 such that the center of the sample chamber 12 is positioned at or very near the desired object plane location 20 (FIG. 1) as defined by the lens 14 and sensor 16 positions along the axis 28 when the sample slide 80 is inserted into the sample input port 74.

The lens 14 may be mounted in a variety of ways. In the implementation of FIG. 3, the lens is provided in a lens housing 130 with a threaded end. The threaded end is installed into a threaded base 132 mounted to the top printed circuit board 90 inside which the sensor 16 is positioned.

In operation, the sensor 16 acquires one or more images of the sample chamber 12. Generally, a series of images are acquired for noise reduction and potentially sperm motion tracking, in some cases one thousand images or more. From these images, a variety of characteristics of objects in the sample chamber can be computed by the processor 18 after receiving the image data from the sensor 16. Algorithms for image analysis for extracting such characteristics are known in the art. Some are described as applied to sperm motility measurements in U.S. Pat. No. 4,896,966 from the 1980's. More recently developed techniques are described in Crocker and Grier, Methods of Digital Video Microscopy for Colloidal Studies, Journal of Colloid and Interface Science 179, pages 298-310 (1996), which journal publication is hereby incorporated by reference in its entirety. This image processing can involve several steps. Initially, static noise and illumination bias may be removed. For a simple count of sperm in the imaged region of the sample chamber, the positions of individual sperm can be detected, and their number counted. This may be referred to as a "simple count." This simple count can be correlated to the volume of sample in the image, and sperm count per milliliter can be calculated. A small number or even only one image can be used to produce a simple count. This value can be displayed on the display 72 or output through the data port 76. In some cases, a simple yes/no output can be generated, indicating whether the count exceeds a threshold such as 20 million per milliliter.

A series of image frames can be further analyzed to detect and count all or predominantly motile sperm that are changing position over time within the sample chamber 12. This can be performed by assigning positions to individual sperm, and detecting changes in those positions over the series of frames. In some algorithms for tracking such motion, an object in a first image is identified as being the same object in a subsequent image, where the position change of the object between the images defines a linear segment of a motion trajectory for the object. Over a series of frames, a contiguous series of such linear segments defines a "track" that is computed for the object over the series of images. With known magnification such that pixel to pixel distance on the image sensor corresponds to known distance in sample chamber, the length of each linear segment of a track can be calculated, and these can be summed to produce a total track length over the series of images for each identified sperm. For biasing the sperm count to count only or predominantly motile sperm, only sperm that have a total track length above a threshold may be counted. Alternatively, only sperm that move a threshold linear distance between their track starting point and track ending point over a defined time period or defined number of sequential images may be counted. This provides a measure of linear progression that biases the count to predominantly ignore sperm that only move in small circles. Instantaneous or near instantaneous velocity information for each identified sperm may be calculated from the length of the track segments and the time between acquisition of each image frame. In this implementation, by collecting a series of velocity values for each identified sperm over the series of images, only sperm that move at or above a threshold average rate or threshold peak rate over or during the series of image frames may be counted. These velocity based types of motion analysis can also provide a count of motile sperm per milliliter. Distance and velocity thresholds can also be combined to bias the count to motile sperm.

Figure 4:
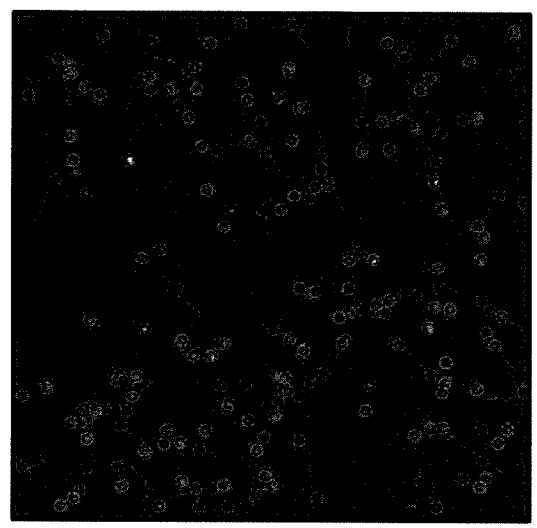
FIG. 4 is an example image taken with an apparatus built according to the block diagram of FIG. 1.

FIG. 4 is a diagnostic image in a series of acquired frames of image data taken of a sperm sample using apparatus and methods in accordance with the principles described above. Identified sperm in the image are circled in their current locations in this frame. Over the course of the series of images leading up to this image frame, the identified sperm traveled along the tracks that terminate at each circle. The number of sperm identified and the track data for each identified sperm can be used to produce an assessment of simple sperm count and/or motile sperm count. The image analysis methods used to produce this data were similar to those described in the Crocker article incorporated by reference above.

Figure 5:
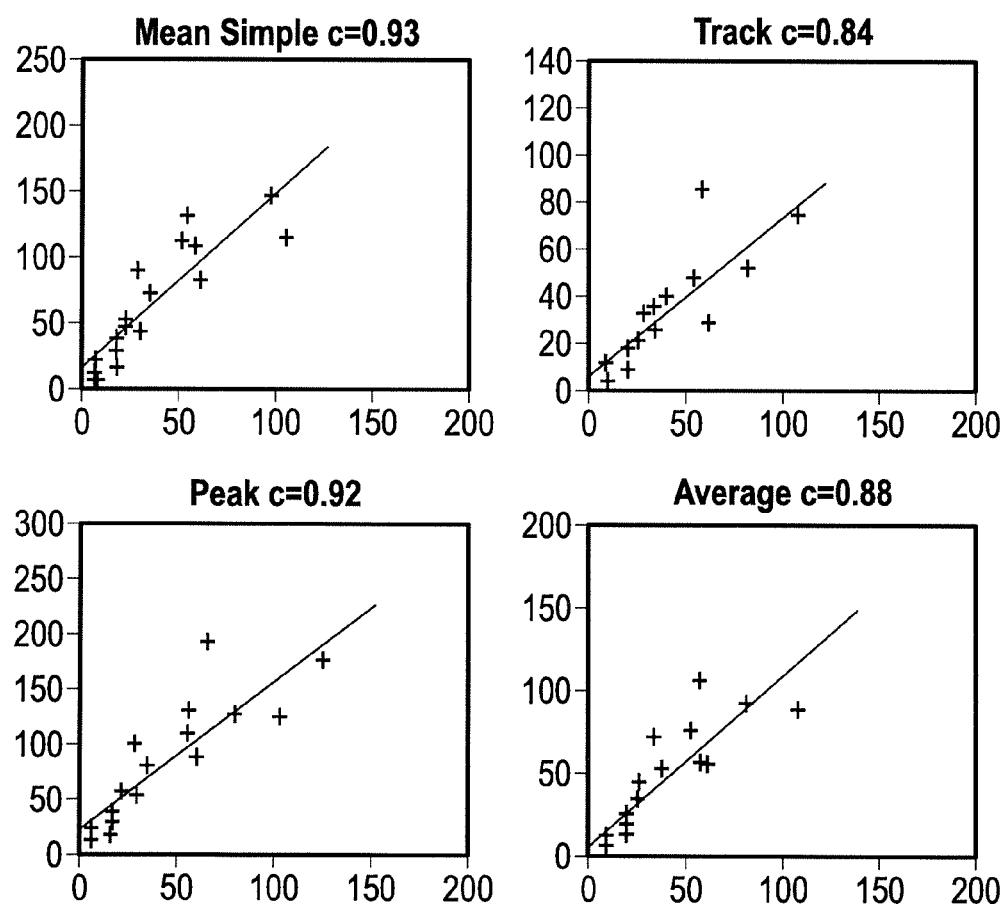
FIG. 5 is a series of graphs comparing male fertility assessments made with an apparatus built according to the principles of FIG. 1 and manual adrologist assessment of male fertility on the same semen samples.

FIG. 5 illustrates a comparison of counts produced with an apparatus using simple, low cost optical components, a small distance between object and image planes, and the image analysis algorithms described above with manual counts produced from the same samples by a trained andrologist. The apparatus computed count is the vertical axis (million/ml), the andrologist count is the horizontal axis (million/me, and each + represents a semen sample analyzed with both methods placed at the intersection of the apparatus analyzed and generated count values and andrologist manual count values. The upper left is for an apparatus analysis involving a simple count of total sperm. The upper right is for an apparatus analysis that counts only or predominantly sperm that moved a total distance from their starting point above a threshold. The lower left is for an apparatus count that counts only or predominantly sperm with a peak velocity above a threshold at some point during the series of frames. The lower right is for an apparatus count that counts only or predominantly sperm that have an average velocity over the series of frames above a threshold.

These graphs show a high correlation between apparatus produced counts and adrologist produced manual counts, showing that very small and low cost digital image analysis apparatus can be made that are highly accurate.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A male fertility assessment apparatus comprising:
a housing having a maximum linear dimension of no more than 100 mm and wherein the ratios of height to width, height to length, and length to width are between 0.1 and 10;
a bright field imaging system contained within the housing; the bright field imaging system comprising:
a backlight;
an optical assembly comprising a lens system having front and back focal lengths of no more than 20 mm each, an aperture area of 1-10 $mm^2$, wherein the front focal length divided by the square root of the aperture area and the back focal length divided by the square root of the aperture area are each 5-20;
a two-dimensional light sensor defining an image plane location that is fixed with respect to the position of the lens system;
a sample holder;
a sample chamber configured for placement in the sample holder to define an object plane location that is fixed with respect to the position of the lens system, wherein the sample chamber has a depth of no more than 0.025 mm;
wherein the image plane position, object plane position, and front and back lens focal lengths define a magnification of no more than 10, and wherein the distance between the object plane and the image plane is no more than 20 mm;
a processing circuit contained within the housing coupled to the light sensor and configured to process data received from the light sensor to assess one or more sperm characteristics; and
an output coupled to the processing circuit and configured to output data indicating one or more sperm characteristics.

2. The male fertility assessment apparatus of claim 1, wherein the object plane and image plane are substantially parallel, and wherein the lens is positioned between the object plane and the image plane along a linear longitudinal axis perpendicular to the object plane and the image plane.

3. The male fertility assessment apparatus of claim 1, wherein the at least one lens is a single simple lens.

4. The male fertility assessment apparatus of claim 3, wherein the lens consists essentially of polymer.

5. The male fertility assessment apparatus of claim 1, wherein the at least one lens is a single compound lens.

6. The male fertility assessment apparatus of claim 1, wherein the light sensor comprises a two dimensional array of light sensitive detectors, each of the light sensitive detectors having a height and width of less than 6 micrometers.

7. The male fertility assessment apparatus of claim 1, wherein the brightfield imaging system comprises a diffuser positioned between the backlight and the sample holder.

8. The male fertility assessment apparatus of claim 1, wherein the processing circuitry is configured to produce a value indicative of motile sperm count.

9. The male fertility assessment apparatus of claim 1, comprising a slide having the sample chamber containing a semen sample positioned in the sample holder.

10. The male fertility assessment apparatus of claim 1, wherein the output comprises one or more of a display panel, an LED, a serial or parallel interface port, and wireless transmission circuitry.

11. The male fertility apparatus of claim 1, wherein the housing has a maximum dimension of no more than 50 mm.

12. A method of assessing male fertility comprising:
placing a sample of semen into a sample chamber having a depth of no more than 0.025 mm;
inserting the sample chamber into a sample holder positioned within a housing adjacent to a lens also positioned within the housing, wherein the housing has a maximum linear dimension of no more than 100 mm and wherein the ratios of height to width, height to length, and length to width are between 0.1 and 10;
illuminating the sample chamber;
producing an image of the semen sample on a two-dimensional light sensor positioned within the housing on the other side of the lens from the sample chamber and no more than 20 mm from the center of the sample chamber;
processing image data from the two-dimensional light sensor; and
outputting an assessment of male fertility based at least in part on the processing.

13. The method of claim 12, wherein the processing comprises counting objects imaged on the two-dimensional light sensor.

14. The method of claim 12, wherein the processing comprises processing a series of images produced at a corresponding series of time points.

15. The method of claim 14, wherein the processing comprises counting moving objects imaged in the series of images.

16. A male fertility assessment apparatus comprising:
a housing having a maximum linear dimension of no more than 100 mm and wherein the ratios of height to width, height to length, and length to width are between 0.1 and 10;
a light source in the housing;
a fixed two-dimensional light sensor in the housing;
a fixed sample holder in the housing defining a sample chamber position located between the light source and the fixed two-dimensional light sensor, the defined sample chamber position being less than 20 mm from the fixed two-dimensional light sensor;
a sample chamber configured for placement in the sample holder, the sample chamber having a depth of no more than 0.025 mm;
one or more fixed lenses in the housing positioned between the fixed sample holder and the fixed two dimensional light sensor, and
processing circuitry in the housing coupled to receive image data from the fixed two dimensional light sensor.

17. The male fertility assessment apparatus of claim 16, wherein the one or more fixed lenses consist of a single simple lens.

18. The male fertility assessment apparatus of claim 16, wherein the one or more fixed lenses consist of a single compound lens.

19. The male fertility assessment apparatus of claim 16, wherein the fixed sample holder and the fixed two-dimensional light sensor are substantially parallel, and wherein the one or more fixed lenses are positioned between the fixed sample holder and the fixed two-dimensional light sensor along a linear longitudinal axis perpendicular to the fixed sample holder and the fixed two-dimensional light sensor.

20. The male fertility assessment apparatus of claim 19, wherein the one or more fixed lenses define front and back focal lengths of no more than 20 mm each, wherein an aperture area of 1-10 mm$^2$ is provided between the fixed sample holder and the one or more fixed lenses; and wherein the front focal length divided by the square root of the aperture area and the back focal length divided by the square root of the aperture area are each 5-20.

* * * * *